(12) United States Patent
Fukama

(10) Patent No.: US 11,215,240 B2
(45) Date of Patent: Jan. 4, 2022

(54) CLUTCH RELEASE BEARING DEVICE

(71) Applicant: NTN CORPORATION, Osaka (JP)

(72) Inventor: Shohei Fukama, Iwata (JP)

(73) Assignee: NTN CORPORATION, Osaka (JP)

( * ) Notice: Subject to any disclaimer, the term of this patent is extended or adjusted under 35 U.S.C. 154(b) by 12 days.

(21) Appl. No.: 16/624,243

(22) PCT Filed: Jun. 8, 2018

(86) PCT No.: PCT/JP2018/022037
§ 371 (c)(1),
(2) Date: Dec. 18, 2019

(87) PCT Pub. No.: WO2019/009011
PCT Pub. Date: Jan. 10, 2019

(65) Prior Publication Data
US 2020/0116209 A1 Apr. 16, 2020

(30) Foreign Application Priority Data

Jul. 3, 2017 (JP) .............................. JP2017-130279

(51) Int. Cl.
*F16D 23/14* (2006.01)
*F16C 19/16* (2006.01)

(52) U.S. Cl.
CPC .............. *F16D 23/14* (2013.01); *F16C 19/16* (2013.01); *F16C 2326/01* (2013.01); *F16D 2023/141* (2013.01)

(58) Field of Classification Search
CPC .............................................. F16D 23/14–148
(Continued)

(56) References Cited

U.S. PATENT DOCUMENTS 4,029,186 A * 6/1977 De Gennes ............. F16D 23/14
192/98
4,561,788 A * 12/1985 Tanaka .................... F16D 23/14
192/11 OB
(Continued)

FOREIGN PATENT DOCUMENTS

JP H3-86349 A 4/1991
JP H9-126290 A 5/1997
(Continued)

OTHER PUBLICATIONS

International Preliminary Report on Patentability including Written opinion of the International Searching Authority for International Application No. PCT/JP2018/022037 dated Jan. 16, 2020 and English translation thereof.
(Continued)

*Primary Examiner* — David R Morris
(74) *Attorney, Agent, or Firm* — Muncy, Geissler, Olds & Lowe, P.C.

(57) ABSTRACT

A self-aligning clutch release bearing in which consideration is taken for a fiber flow in a steel sheet of which a side plate is made. Specifically, the side plate is formed with cutout portions at locations where an imaginary line passing through the cutout portions and the center of an inner-diameter portion is across the fiber flow in the steel sheet of which the side plate is made. With this arrangement, the present invention makes it possible that cracks do not develop easily from the cutout portions when a flange portion is formed by means of burring process after the side plate is punched by means of blanking process. This leads to improved yield and increased strength of the side plate.

4 Claims, 9 Drawing Sheets

(58) Field of Classification Search
USPC .................................................... 192/110 B
See application file for complete search history.

(56) References Cited

U.S. PATENT DOCUMENTS

| | | | | |
|---|---|---|---|---|
| 4,874,073 A | * | 10/1989 | Tagawa | ................... F16D 23/14 |
| | | | | 192/98 |
| 5,976,053 A | | 11/1999 | Kino et al. | |

FOREIGN PATENT DOCUMENTS

| | | | | |
|---|---|---|---|---|
| JP | 11270586 A | * | 10/1999 | ........... F16D 23/142 |
| JP | 2000-55079 A | | 2/2000 | |
| JP | 2005-88668 A | | 4/2005 | |
| JP | 2006-38159 A | | 2/2006 | |
| JP | 2006105323 A | * | 4/2006 | .............. F16C 33/62 |
| JP | 2009-68537 A | | 4/2009 | |
| JP | 2009-131874 A | | 6/2009 | |

OTHER PUBLICATIONS

English Translation of International Search Report of PCT/JP2018/022037 dated Aug. 21, 2018.

* cited by examiner

CLUTCH RELEASE BEARING DEVICE

TECHNICAL FIELD

The present invention relates to a clutch release bearing device which is disposed between an engine and a transmission in an automobile to engage/disengage power transmission from the engine to the transmission.

BACKGROUND ART

As shown in FIG. 6, a clutch release bearing device A is disposed in a manual-transmission automobile, between an engine (output shaft 21) and a transmission 22. The clutch release bearing device A is pushed by a clutch release fork 23 that pivots interlocking with the operation of a clutch pedal (not illustrated) and slides on an outer circumference of a retainer 24 extending from the transmission, toward the engine thereby temporarily disengaging transmission of engine rotation power to the transmission 22.

As a type of this clutch release bearing device A, there is known a self-aligning type (Patent Literatures 1 through 3).

As shown in FIG. 6 and FIG. 7, a self-aligning clutch release bearing device A includes a release hub 27 which slides on the retainer 24, a release bearing 28, and a side plate 29 which extends radially outward from an outer circumference of the release hub 27 for contact with a front face of a tip portion of the clutch release fork 23. The release bearing 28 has an inner ring 28a, an outer ring 28b, rolling elements 28c, and a retainer 28d. The inner ring 28a is fitted around the release hub 27, and makes contact with a diaphragm spring 31 (FIG. 6) of the clutch device. The outer ring 28b is pressed by elastic means 30 toward the side plate 29 and makes slidable contact with the side plate 29 from one side.

When the clutch pedal (not illustrated) is pressed, the clutch release fork 23 pivots counterclockwise in FIG. 6, and makes contact with the side plate 29 from the other side, thereby pressing the clutch release bearing device A to slide axially toward the engine. This makes the inner ring 28a of the release bearing 28 contact the diaphragm spring 31 of a clutch device B. Then, deflection of the diaphragm spring 31 moves a pressure plate 34, which presses the clutch disc 32 onto the flywheel 33, away from the clutch disc 32, whereby rotation power of the rotating output shaft 21 of the engine is temporarily disengaged from the transmission 22.

If there is an axial alignment error between the engine axis and the transmission axis, the release bearing 28 in the clutch release bearing device A slides radially as much as the amount of error to automatically correct the alignment error.

CITATION LIST

Patent Literature

Patent Literature 1: JP 2000-55079 A
Patent Literature 2: JP 2006-38159 A
Patent Literature 1: JP 2009-68537 A

SUMMARY OF INVENTION

Technical Problem

The release hub 27 which makes sliding movement on the front cover 24 is made of resin. The side plate 29 is integrated with the release hub 27 by means of insert molding.

As shown in FIG. 8 through FIG. 10, the side plate 29 which is integrated with the resin release hub 27 by means of insert molding is made by pressing a cold roll steel sheet for example, into a generally disc-like shape, and by forming a contact portions 29a on its outer circumference for making contact with the clutch release fork 23.

The side plate 29 has an inner-diameter hole 29b which is buried in the release hub 27. The inner-diameter hole 29b is formed with an axially extending inner-diameter curved portion 29c, and this inner-diameter curved portion 29c is formed with cutouts 29d for prevention of rotation in the rotating direction.

As shown in FIG. 11, the side plate 29 is made by blanking a cold roll steel sheet C, and then burring to form the inner-diameter curved portion 29c.

The cold roll steel sheet C has a fiber-like metallographical structure called fiber flow as illustrated conceptually in fine lines in FIG. 11.

Conventionally, no consideration is made to the fiber flow in the cold roll steel sheet C when the side plate 29 is made by the blanking process. As a result, there has been cases as shown in FIG. 11 for example, that a line which passes through the cutouts 29d that are made in the inner diameter surface of the inner-diameter hole 29b and through the center of the inner-diameter hole 29b is parallel to the direction of the fiber flow.

Note that FIG. 8 and FIG. 9 also show the direction of the fiber flow in fine lines in a conceptual fashion.

If this happens, there is an increased incidence of crack development starting from the cutouts 29d when the inner-diameter curved portion 29c is formed by means of burring after the blanking process. In other words, yield of the side plate 29 from the machining process decreases. Also, it is learned that the cracks decrease strength of the side plate 29.

Especially, due to recent trend of increased engine output, the side plate 29 is subject to an increased input load when contacted by the clutch release fork 23, and this leads to a requirement for increased strength of the side plate 29.

It is therefore an object of the present invention to improve yield of the side plate at the time of machining and increase strength of the side plate of a self-aligning clutch release bearing device.

Solution to Problem

In order to achieve the above-mentioned object, the present invention provides an arrangement which includes: a release hub made of a resin; a release bearing fitted around the release hub; a generally disc-like side plate contacted by a clutch release fork; an elastic member for application of a predetermined axial load to the release bearing; and a cover for holding the release bearing, the side plate and the elastic member. In this arrangement, the side plate has a main body portion extending radially for making contact with the clutch release fork; and a flange portion extending from an inner diameter edge of the main body portion for being buried into the release bearing. The flange portion is formed with a cutout portion for prevention of the side plate from rotating relatively to the release hub; and the cutout portion is at a location where an imaginary line passing through the cutout portion and the center of the side plate is across a fiber flow in the steel sheet of which the side plate is made.

It is preferable that the imaginary line passing through the cutout portion and the center of the side plate is across the fiber flow in the steel sheet of which the side plate is made, at an angle in a range of 45 degrees through 90 degrees.

It is preferable that the steel sheet of which the side plate is made is provided by a chromium molybdenum steel.

Advantageous Effects of Invention

As described above, according to the self-aligning clutch release bearing device offered by the present invention, consideration was made into the fiber flow in the steel sheet of which the side plate is made and as a result, the cutout portion in the curved portion of the side plate is provided at a location where an imaginary line passing through the cutout portion and the center of the side plate is across the fiber flow in the steel sheet of which the side plate is made. Therefore, even when the curved portion is formed by means of burring process after the side plate is punched by means of blanking process, the cracks do not develop easily from the cutout portion in the curved portion, making it possible to improve yield from a machining process of the side plate and improve strength of the side plate.

BRIEF DESCRIPTION OF DRAWINGS

FIG. 8 is punched out of the steel sheet.

DESCRIPTION OF EMBODIMENTS

Hereinafter, description will be made for a clutch release bearing device 20 according to an embodiment of the present invention, with reference to the attached drawings.

Figure 1:
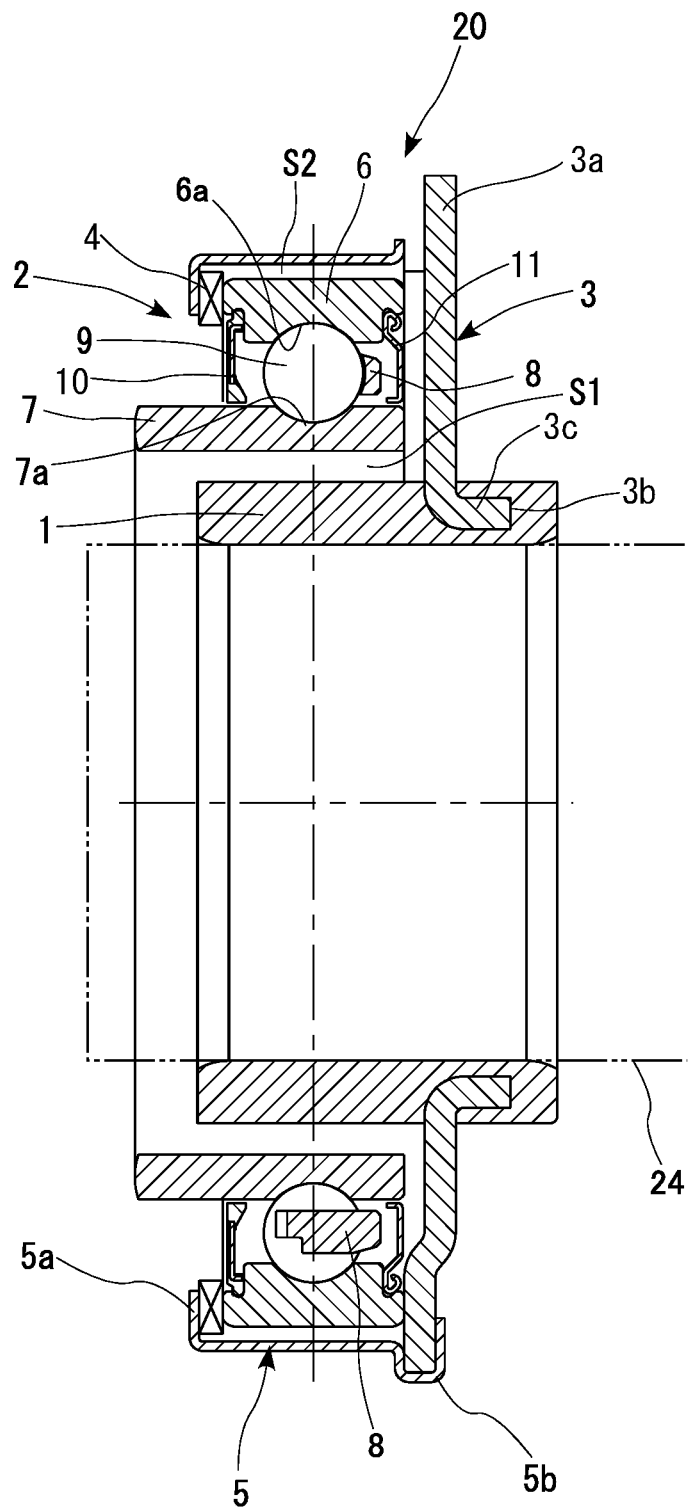
FIG. 1 is a sectional view of a self-aligning clutch release bearing device according to an embodiment of the present invention.
Figure 6:
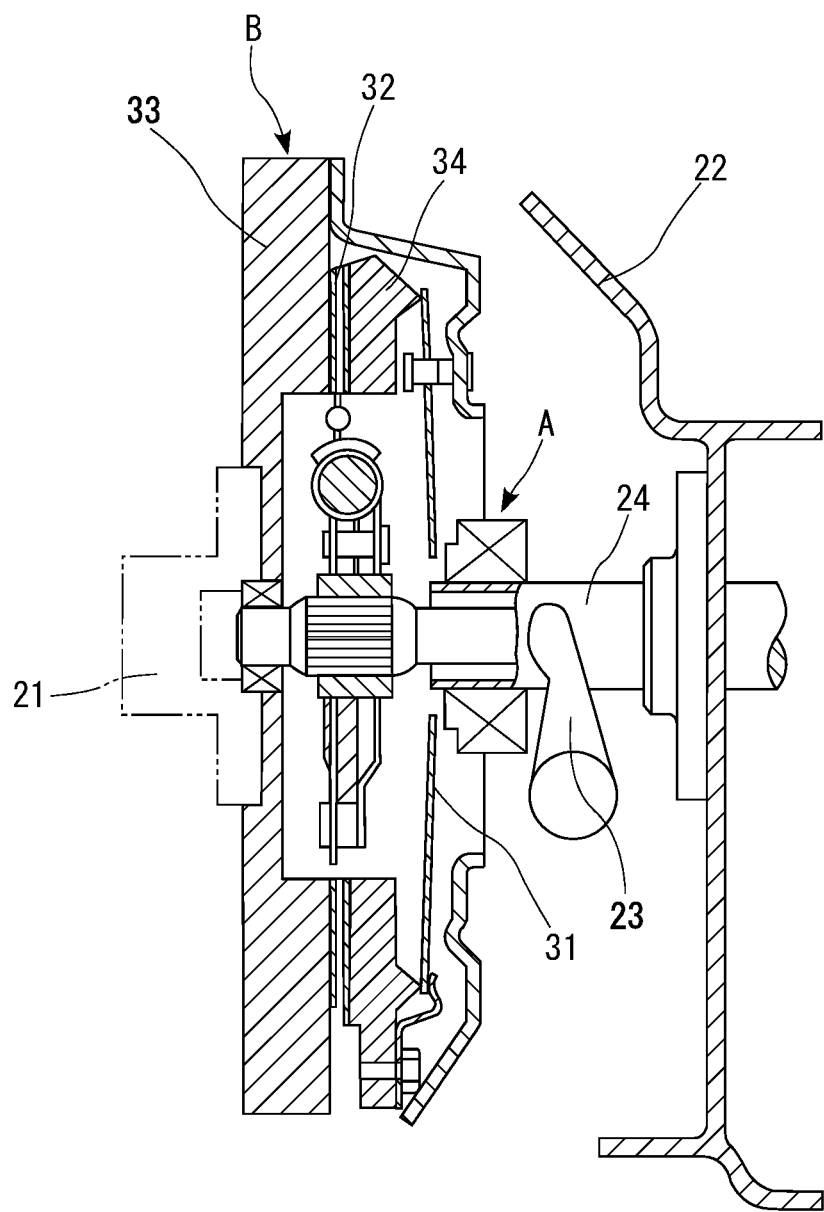
FIG. 6 is a simplified sectional view showing a clutch device and its surrounds in an automobile.
Figure 7:
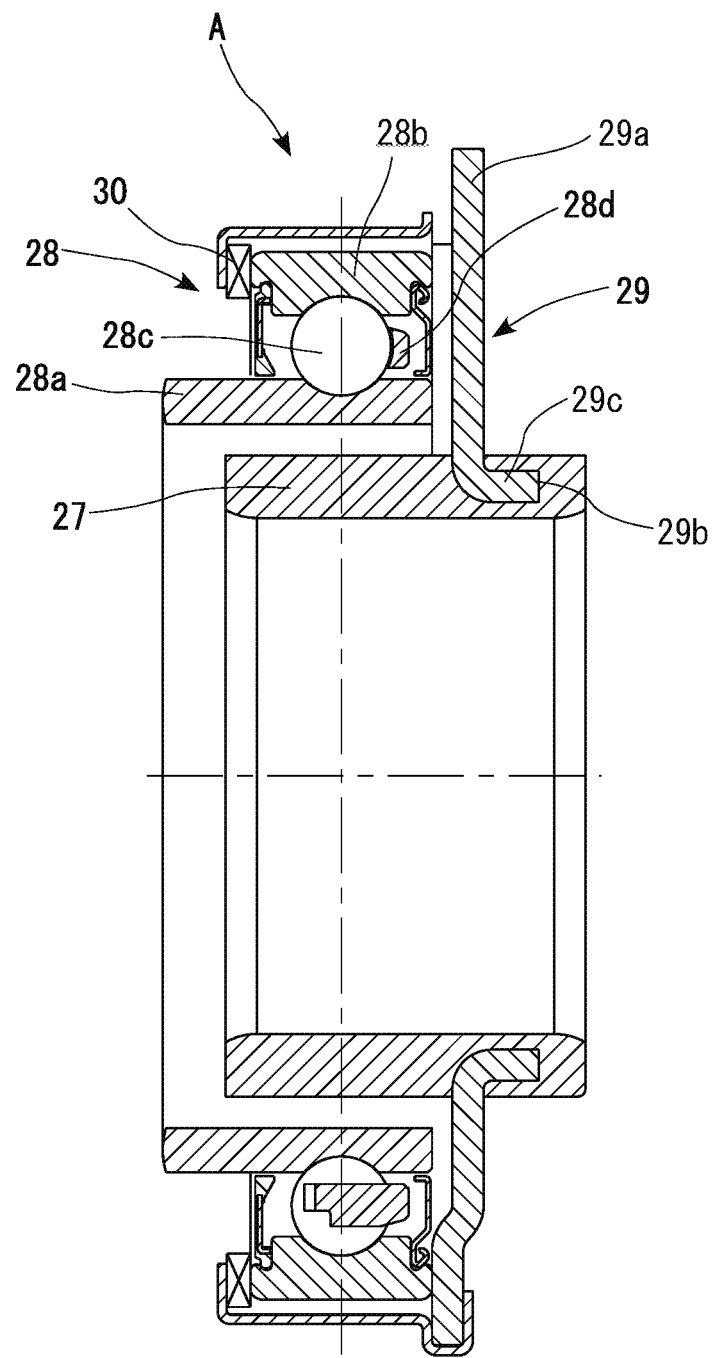
FIG. 7 is a sectional view of a conventional self-aligning clutch release bearing device.
Figure 8:
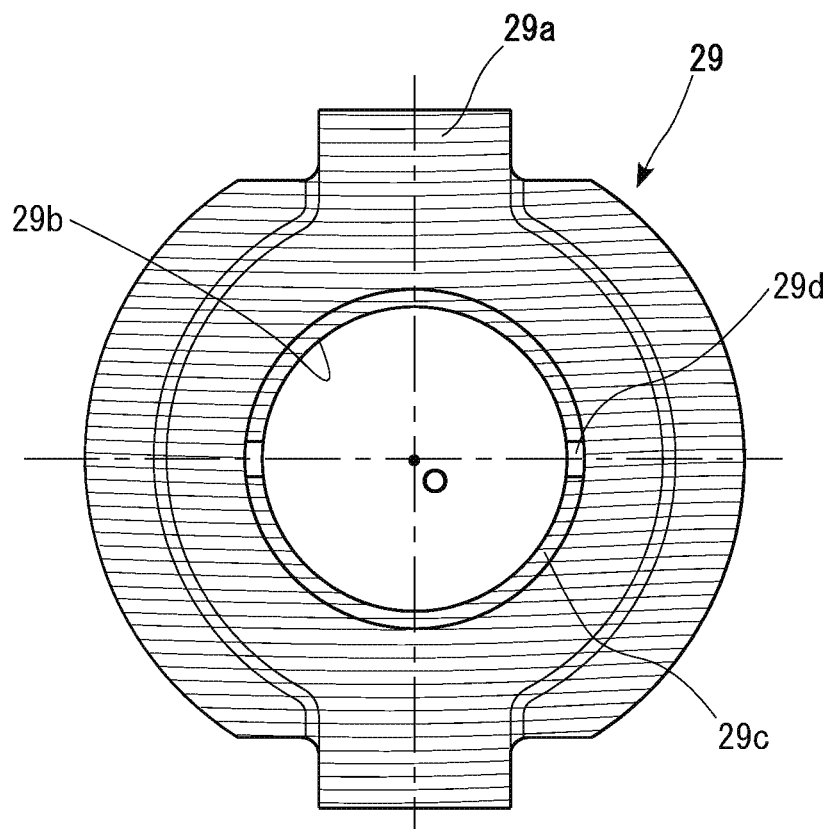
FIG. 8 is a plan view of a side plate used in the self-aligning clutch release bearing device in FIG. 7.
Figure 9:
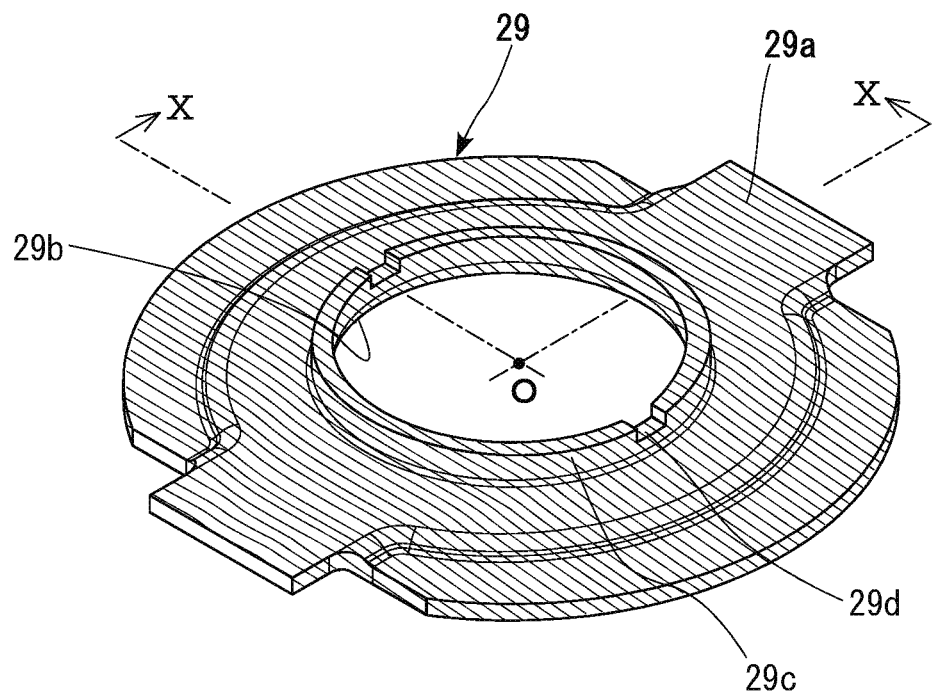
FIG. 9 is a perspective view of the side plate used in the self-aligning clutch release bearing device in FIG. 7.
Figure 10:
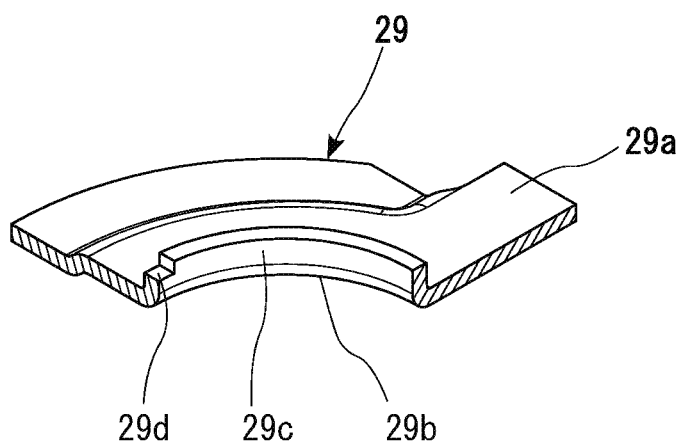
FIG. 10 is a sectional view taken in a line X-X in FIG. 9.
Figure 11:
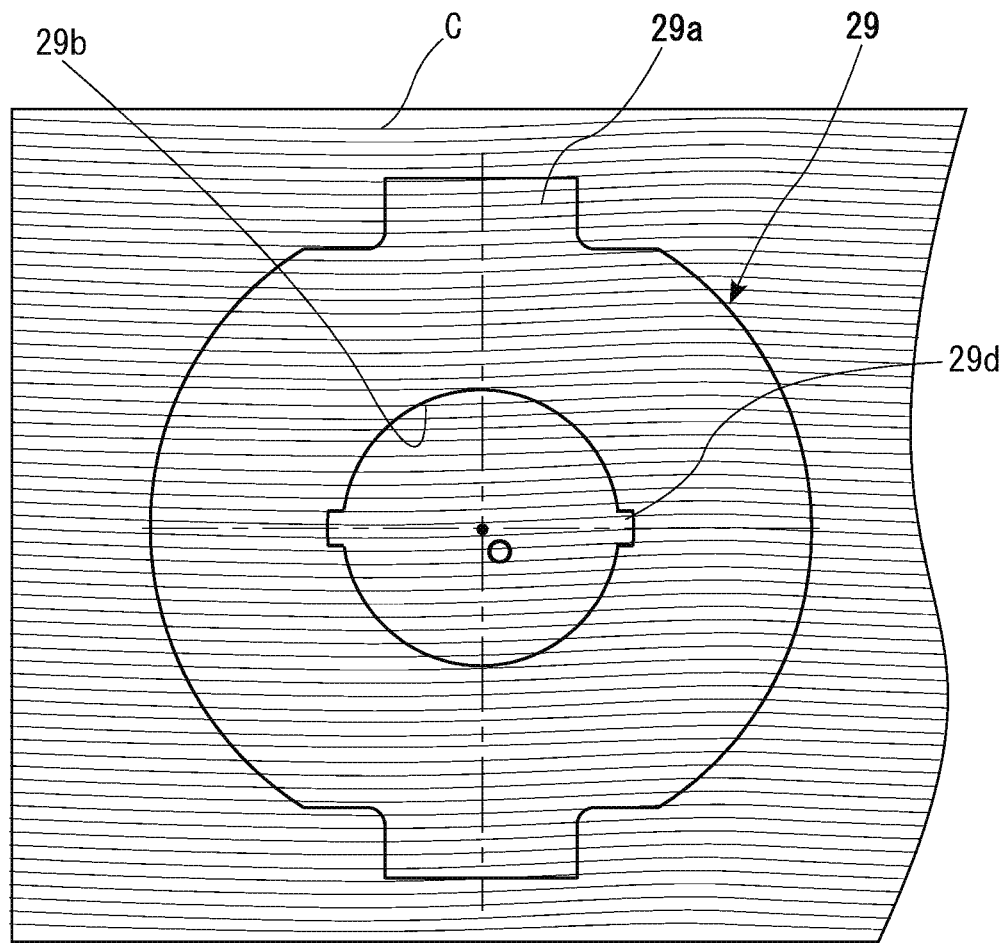
FIG. 11 is a plan view which shows a positional relationship between a fiber flow in a steel sheet and a cutout portion in the side plate when the side plate

As shown in FIG. 1 and FIG. 6, the clutch release bearing device 20 is attached to a manual transmission 22 of an automobile or the like. The clutch release bearing device 20 is part of a clutch mechanism, which includes: a clutch device B placed in a power transmission path between an engine (output shaft 21) and the manual transmission 22; a retainer (front cover) 24 covering an input shaft of the transmission 22; a clutch release fork 23 that is pivoted interlocking with the operation of a clutch pedal (not illustrated); and the clutch release bearing device 20. The clutch release bearing device 20 is axially amounted around the retainer 24 in a slidable fashion, and slides axially on the retainer 24 toward the engine to contact a diaphragm spring 31 of the clutch device B as the clutch release fork 23 pivots, whereby transmission of the engine rotation power to the transmission 22 is temporarily disengaged.

The clutch release bearing device 20 includes: a release hub 1; a release bearing 2 which is fitted around the release hub 1; a generally disc-like side plate 3 to be contacted by the clutch release fork (not illustrated); an elastic member 4 which applies a predetermined axial load to the release bearing 2; and a cover 5 which holds the release hub 1, the release bearing 2, the side plate 3 and the elastic member 4.

The clutch release bearing device 20 according to the present embodiment is a self-aligning clutch release bearing device. If there is an axial alignment error between the engine axis and the transmission axis, the self-aligning clutch release bearing device 20 allows the release bearing 2 to slide radially as much as the amount of error to automatically correct the misalignment between the two axes.

The release hub 1 is a sleeve which is axially slidable on the retainer 24 extended from the manual transmission 22. The release hub 1 is cylindrical. The release hub 1 is made of an artificial thermoplastic resin such as PA (polyamide) 66. The resin material for forming the release hub 1 may have enhancers, such as carbon fiber, mixed at a rate of 5 through 25 weight percent.

The release bearing 2 includes an outer ring 6, an inner ring 7, a retainer 8, and rolling elements 9. In the present embodiment, the release bearing 2 is a ball bearing. The outer ring 6 is fitted around the release hub 1 with a predetermined radial gap thereto, and has an inner circumference formed with an outer rolling surface 6a. The inner ring 7, which is fitted in the outer ring 6, has an outer circumference formed with an inner rolling surface 7a facing the outer rolling surface 6a and extends radially outward. Between the rolling surface 6a of the outer ring 6 and the rolling surface 7a of the inner ring 7, a plurality of rolling elements (balls) 9 are rollably retained by a retainer 8. The outer ring 6 has its two ends provided with seals 10, 11. The seals 10, 11 prevent lubrication grease packed inside the bearing from leaking outside while also preventing rain water, dust and other foreign matters from entering the bearing.

The inner ring 7 is fitted around the release hub 1, and makes contact with the diaphragm spring 31 of the clutch device B. At this occasion, deflection of the diaphragm spring 31 moves a pressure plate 34, which presses the clutch disc 32 onto the flywheel 33, away from the clutch disc 32, whereby rotation power of the rotating output shaft 21 of the engine is temporarily disengaged from the transmission 22.

Figure 2:
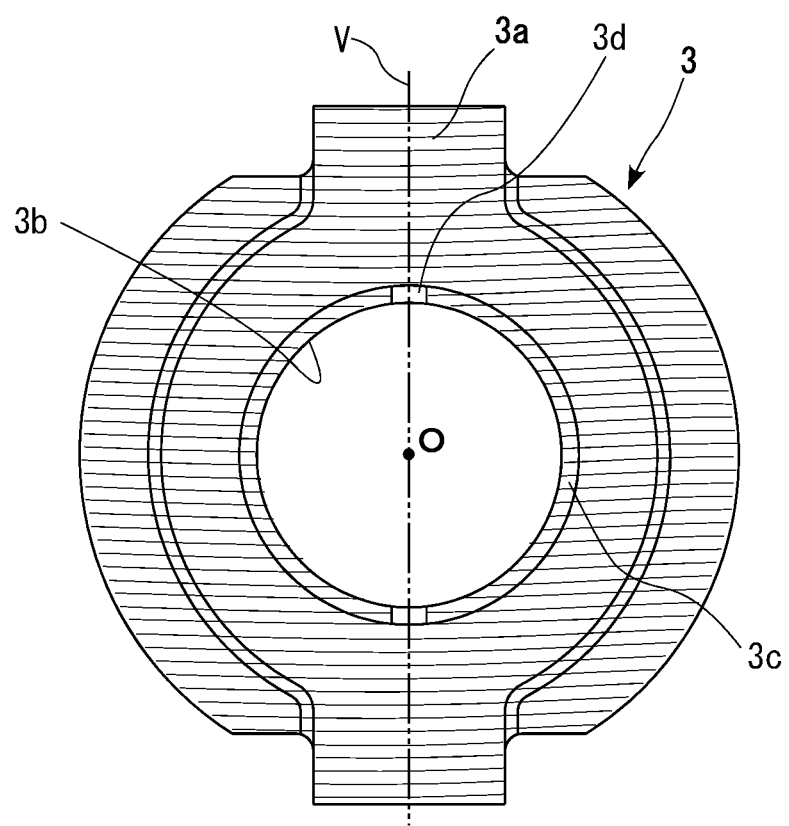
FIG. 2 is a plan view of a side plate used in the self-aligning clutch release bearing device in FIG. 1.
Figure 3:
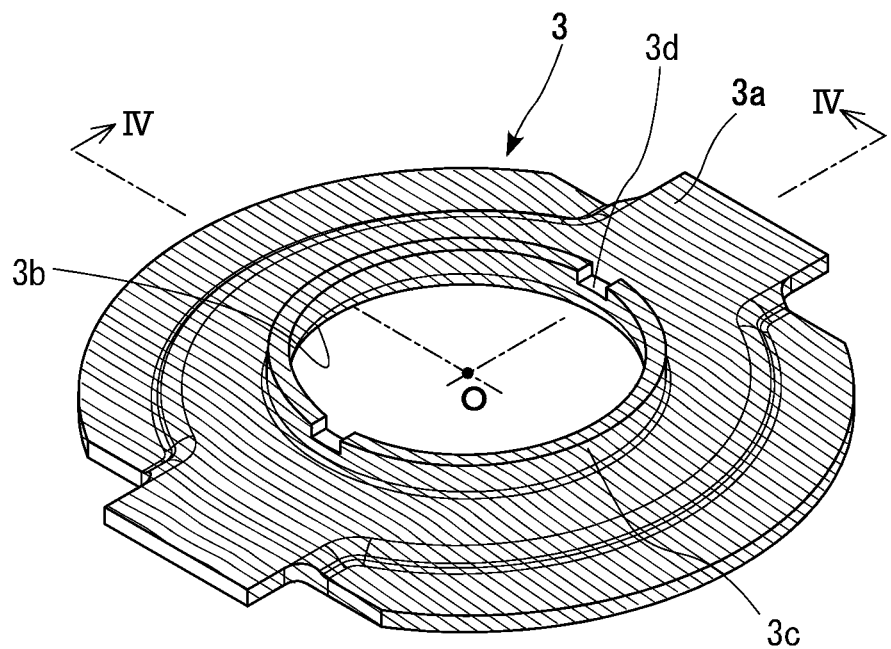
FIG. 3 is a perspective view of the side plate used in the self-aligning clutch release bearing device in FIG. 1.
Figure 4:
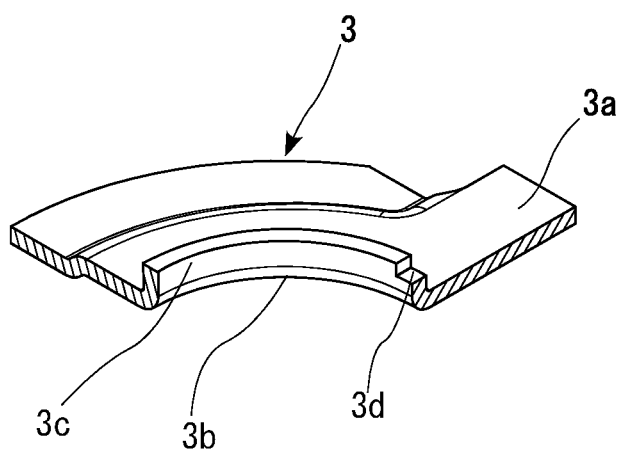
FIG. 4 is a sectional view taken in a line IV-IV in FIG. 3.

As shown in FIG. 2 through FIG. 4, the side plate 3 is generally disc-shaped and is made by pressing a steel sheet.

The material steel sheet for the side plate 3 is provided by a carburized steel sheet. In the present embodiment, the side plate 3 is made of a steel sheet C which is provided by an SCM (chromium molybdenum steel). Specifically, a predetermined shape is obtained from a cold rolled steel sheet of SCM by means of a pressing operation.

SCM steel has a higher surface hardness than SPCC steel and therefore is superior in terms of mechanical properties. For this reason, it is preferable to use a stronger SCM steel for the side plate 3 which is subjected to increased input load in recent years due to increased output from the engine. SCM steel is classified into a plurality of types according to its carbon content. Among these, SCM415 is the most preferable. By selecting the SCM steel as the material for the side plate 3, it becomes possible to satisfy mechanical properties required of the side plate 3. After being pressed into a predetermined shape, the side plate 3 may undergo a carbonitriding process for increased surface hardness. For example, the side plate 3 may undergo a carburizing and quenching process to attain a surface hardness of 54 through 64 HRC to reduce wearing of the side plate 3 from contact by the clutch release fork 23.

The side plate 3 is formed with a radially extending main body portion 3a. The main body portion 3a makes engagement with the clutch release fork and guide it. The side plate 3 is integrated with the release hub 1, which is made of resin, by means of an insert molding. The main body portion 3a has its inner diameter edge buried in the release hub 1.

The side plate 3 has a flange portion 3c which extends from the inner diameter edge of the main body portion 3a axially in one direction (toward the transmission 22). The flange portion 3c is buried in the release hub 1. The main body portion 3a and the flange portion 3c represent an inner diameter portion 3b which is the portion buried in the release hub 1. The flange portion 3c is formed with cutout portions 3d which prevent the side plate 3 from rotating relatively to the release hub 1. The cutout portions 3d are made at locations which will be described later. It should be noted here that the flange portion 3c may extend from the inner diameter edges of the main body portion 3a axially in the other direction (toward the engine).

The elastic member 4 is, for example, a disc spring made by pressing a steel sheet. Specifically, the elastic member 4 is provided by an open-ended ring which has a flat sections and a plurality, e.g., three to five, of waves, and is made of a steel wire (JIS SW or SWP series) by means of waving and rounding processes followed by heat treatment, i.e., stress relief annealing and subsequent age hardening.

The cover 5 is made of a corrosion resistant steel sheet, such as a cold rolled steel (JIS SPCC series), and an austenitic stainless steel sheet (JIS SUS304 series), by means of pressing into a cylindrical shape to cover the release bearing 2. The cover 5 has its one end portion formed with an inward flange 5a for housing the elastic member 4, and another end portion formed with tabs at a plurality of locations in circumferential direction. These tabs 5b are crimped onto an outer diameter portion of the side plate 3 to hold the elastic member 4, the outer ring 6 and the side plate 3 together in order to prevent the separation.

Since the elastic member 4 does not slide against the inward flange 5a of the cover 5, the cover 5 does not have a chance for uneven wear. Therefore, it is possible to maintain a predetermined holding force and to hold the release bearing 2 at an alignment position for a long period of time.

In other words, the release bearing 2 has its outer ring 6 elastically held by the elastic member 4 which is provided by an open-ended ring having a plurality of waves, whereas the release bearing 2 is fitted around the release hub 1 with a predetermined radial gap therefrom.

Between the outer circumference of the release hub 1 and the inner circumference of the inner ring 7 of the release bearing 2, there is a radial gap S1. Between the outer circumference of the outer ring 6 of the release bearing 2 and the inner circumference of the cover 5, there is a radial gap S2 which is smaller than the radial gap S1. With these arrangements, the elastic member 4 which is placed between the outer ring 6 and an inner surface of the cover 5 urges the outer ring 6 elastically onto an end surface of the side plate 3. This makes the release bearing 3 held between the outer circumference of the release hub 1 and the end surface of the side plate 3, radially slidably, i.e., floatably. The radial gaps S1, S2 allow radial, self-aligning movement of the release bearing 2 relative to the release hub 1 and the side plate 3, and the amount of movement is limited by the smaller radial gap S2. Therefore, in cases where there is an assembly error for example, between the axis of the release hub 1 and the axis of the output shaft 21 leading to misalignment between the rotation axis of the diaphragm spring 31 and the rotation axis of the clutch release bearing device 20, the release bearing 2 moves accordingly to the amount of error, whereby the misalignment is automatically corrected.

Next, the side plate 3 used in the self-aligning clutch release bearing device 20 according to the present invention is integrated with the cylindrical, resin release hub 1 at the end of the hub opposed to the transmission (not shown) by means of insert molding.

Next, description will cover how the side plate 3 is made.

Figure 5:
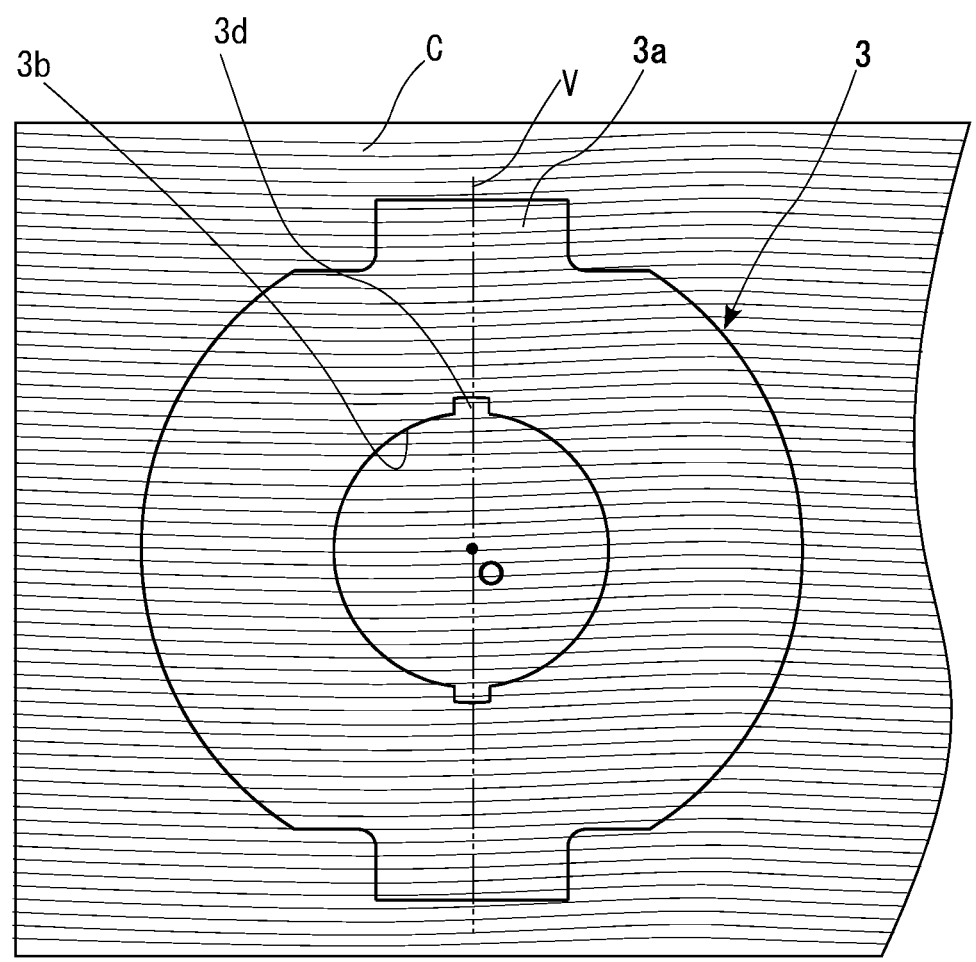
FIG. 5 is a plan view which shows a positional relationship between a fiber flow in a steel sheet and cutout portions in the side plate when the side plate in FIG. 2 is punched out of the steel sheet.

First, as shown in FIG. 5, by means of a blanking process, a generally disc-like piece is obtained from a SCM steel sheet C as a base piece for making the side plate 3 including the inner diameter portion 3b. Then, a burring process is performed to an area surrounding the region which is to become the inner diameter portion 3b (the inner diameter portion of the main body portion 3a), to form a flange portion 3c.

The flange portion 3c in the side plate 3 is formed with cutout portions 3d to prevent rotation when buried and fixed into the release hub 1. In order to prevent cracks from developing at the cutout portions 3d when the burring process is performed to the flange portion 3c, locations for the cutout portions 3d of the side plate 3 are selected with consideration into the direction of fiber flow in the steel sheet C.

Specifically, as shown in FIG. 2 and FIG. 5, the cutout portions 3d are provided at locations where an imaginary line V (alternate long and two short dashes lines in FIG. 2 and FIG. 5) which passes through the cutout portions 3d and the center O of the side plate 3 (inner diameter portion 3b) is across the fiber flow which is drawn conceptually by fine lines, so that the cracks will not develop at the time of burring process. This makes it possible to prevent low yield from machining process of the side plate 3, and also to ensure strength of the side plate 3.

Note that FIG. 2 and FIG. 3 also show the direction of the fiber flow in fine lines in a conceptual fashion. In the embodiment shown in FIG. 2 through FIG. 4, the cutout portions 3d are provided at locations where the imaginary line V which passes through the cutout portions 3d and the center O of the inner diameter portion 3b is across the fiber flow at an angle of 90 degrees.

However, the angle at which the imaginary line V that passes through the cutout portions 3d and the center O of the side plate 3 makes with the fiber flow is not limited to 90 degrees. Specifically, any angle in a range of 45 degrees through 90 degrees will be fine. However, a maximum strength improvement is obtained when the angle is 90 degrees as in the present embodiment.

Thus far, embodiments of the present invention have been described, but the present invention is not limited to these embodiments. Any of these embodiments should be taken as examples and may be modified in many ways within the scope of the present invention.

REFERENCE SIGNS LIST

1: Release hub
2: Release bearing
3: Side plate
3a: Main body portion

3b: Inner diameter portion
3c: Flange portion
3d: Cutout portion
4: Elastic member
5: Cover
5A: Inward flange
5b: Tab
6: Outer ring
6a: Outer rolling surface
7: Inner ring
7a: Inner rolling surface
8: Retainer
9: Side plate
10, 11: Seal
C: Steel sheet

The invention claimed is:

1. A clutch release bearing device comprising:
a release hub made of a resin;
a release bearing fitted around the release hub;
a generally disc-like side plate contacted by a clutch release fork;
an elastic member for application of a predetermined axial load to the release bearing; and
a cover for holding the release bearing, the side plate and the elastic member;
the side plate having a main body portion extending radially for making contact with the clutch release fork; and a flange portion extending axially from an inner diameter edge of the main body portion for being buried into the release hub,
the flange portion being formed with a cutout portion for prevention of the side plate from rotating relatively to the release hub,
the cutout portion being at a location where an imaginary line passing through the cutout portion and the center of the side plate is across a fiber flow in a steel sheet of which the side plate is made, wherein
the imaginary line passing through the cutout portion and the center of the side plate is across the fiber flow in the steel sheet of which the side plate is made, at an angle in a range of 45 degrees through 90 degrees,
the flange portion has another cutout portion for prevention of the side plate from rotating relatively to the release hub,
the flange portion does not have any cutout portion other than the pair of the cutoff portions,
the imaginary line is defined by passing through both of the cutoff portions and the center of the side plate wherein the center of the side plate is determined by the inner diameter edge of the main body portion, which has a circular shape, and
there is no imaginary line other than the imaginary line, which is associated with the side plate.

2. The self-aligning clutch release bearing device according to claim 1, wherein the steel sheet of which the side plate is made is provided by a chromium molybdenum steel.

3. The self-aligning clutch release bearing device according to claim 1, wherein
the imaginary line is perpendicular to the fiber flow, seen from a plan view of the side plate.

4. The self-aligning clutch release bearing device according to claim 3, wherein the steel sheet of which the side plate is made is provided by a chromium molybdenum steel.

* * * * *